United States Patent
Joh (10) Patent No.: US 6,717,954 B1
(45) Date of Patent: Apr. 6, 2004

(54) APPARATUS FOR TRANSMITTING AND RECEIVING MESSAGES BETWEEN PROCESSORS IN A DISTRIBUTED-TYPE PROCESSING SYSTEM

(75) Inventor: Yong-In Joh, Kunpo (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/368,427

(22) Filed: Aug. 5, 1999

(30) Foreign Application Priority Data

Sep. 7, 1998 (KR) .............................. 98-36812

(51) Int. Cl.[7] .............................................. H04J 3/24
(52) U.S. Cl. .................. 370/473; 370/473; 370/474; 370/470
(58) Field of Search ................. 370/470, 471, 370/473, 474, 428, 394, 476, 93, 94.1, 477

(56) References Cited

U.S. PATENT DOCUMENTS

| 4,745,599 | A | * | 5/1988 | Raychaudhuri | ............. 370/93 |
| 4,839,891 | A | * | 6/1989 | Kobayashi | .................. 370/94 |
| 5,307,351 | A | * | 4/1994 | Webster | ..................... 370/470 |
| 5,343,475 | A | * | 8/1994 | Matsuda | .................... 370/94.1 |
| 5,802,050 | A | * | 9/1998 | Petersen et al. | ............. 370/394 |
| 6,317,430 | B1 | * | 11/2001 | Knisely | ....................... 370/394 |
| 6,345,056 | B1 | * | 2/2002 | Bharucha et al. | .......... 370/474 |

OTHER PUBLICATIONS

Douglas E. Comer, Internetworking with TCP/IP vol. I Principles, Protocols, and Architecture, Prentice–Hall, Inc, Volume dated 1995, pp. 89–107, 159–177, 179–189, 191–227, and 583.*

* cited by examiner

Primary Examiner—Dang Ton
Assistant Examiner—Robert W. Wilson
(74) Attorney, Agent, or Firm—Fleshner & Kim, LLP (57) ABSTRACT

The present invention relates to an apparatus for transmitting and receiving a message between processors for a distributed type processing system and a method therefor. In the distributed type processing system capable of performing a real time communication among a plurality of processors, there are provided the steps for packing a plurality of messages in a certain message format when transmitting a message, judging an information included in the message format when receiving a message from another processor, and unpacking the packed messages into a plurality of messages.

13 Claims, 5 Drawing Sheets

APPARATUS FOR TRANSMITTING AND RECEIVING MESSAGES BETWEEN PROCESSORS IN A DISTRIBUTED-TYPE PROCESSING SYSTEM

BACKGROUND OF THE INVENTION

1. Field of the Invention

The present invention relates to an apparatus for transmitting and receiving a message between processors for a distributed type processing system and a method therefor.

2. Description of the Background Art

Generally, a communication method between processors for a conventional distributed type processing system is implemented using a sliding-window flow control protocol capable of transmitting and receiving a message of a size N of an existing window, namely, a certain size for continuously transmitting a message between processors at one time, based on a selective ARQ(Automatic Repeat reQuest) method.

In other words, if there is a message to be transmitted to the opponent processor, it is judged whether there is an empty slide at a window of the destination. If more than one slide is empty, the message is immediately transmitted. If there is not the empty slide, the message is temporarily stored in a send queue. If there is an empty slide, the message is transmitted thereto based on the sliding window flow control protocol. In the thusly constituted conventional distributed type processing system, the state of the window slide based on the sliding window flow protocol when a message is transmitted and received between processors for the conventional distributed type processing system will be explained with refernce to FIG. 1.

Figure 1:
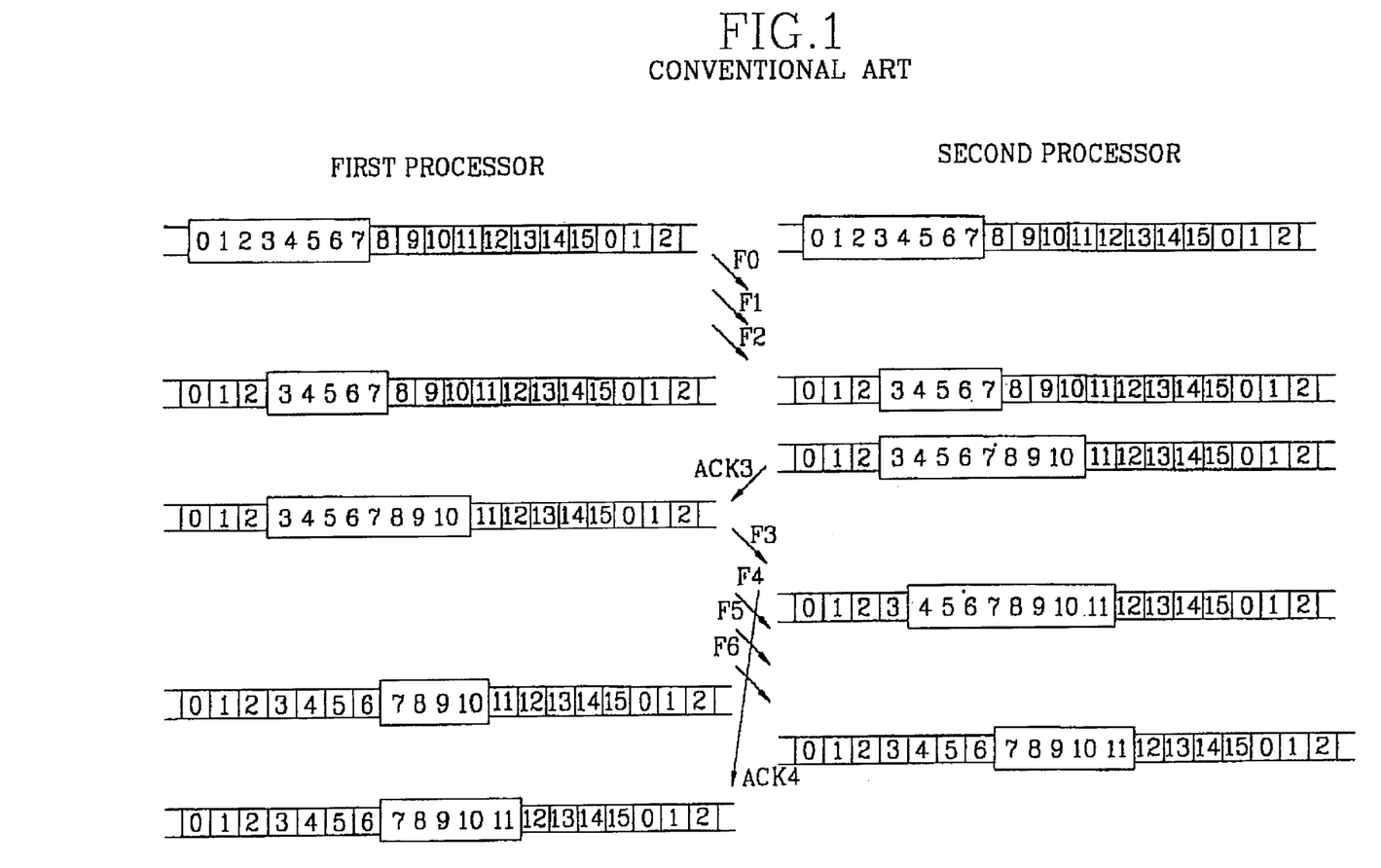
FIG. 1 is a view illustrating a state of a window slide when transmitting and receiving a message based on a sliding window protocol between processors for a conventional distributed type processing system.

FIG. 1 illustrates a case that a message is transmitted from a first processor to a second processor. At an initial state for transmitting and receiving a message between processors, the window memories of the first and second processors are empty, namely, the window slides 0~7 are empty. In this state, the message is stored into the window slides 0, 1, and 2 for transmitting the message to the first and second processors, respectively. When the messages F0, F1, and F2 are transmitted to the second processor side, since the second processor receives the message at the window slides 0, 1, and 2, the window slides 3~7 of the first and second processors are emptied.

At this time, an ACK3 signal with respect to the window slide number which is received in the future by the second processor is transmitted to the first processor, and at the same time, the window slides 3~10 are emptied. The first processor receives an ACK3 signal from the second processor, and the window slides 3~10 are emptied.

In order to transmit a message from the first processor to the second processor, when the message is stored into the window slides 3~6 the window slides 7~10 continuously remain empty. If the messages F3~F6 stored in the window slides 3~6 are transmitted from the first processor to the second processor, the second processor receives the message and processes the same. As the second processor receives the message F3 of the window slide 3, when an ACK4 signal with respect to the window slide number which is received at the next time is transmitted to the first processor, the second processor continuously receives the messages F4~F6 from the first processor in a state that the window slides 4~11 are empty, so that the window slides 7~11 are emptied.

At this time, the first processor receives the ACK4 signal from the second processors. Since the window slides 4~6 are in use, the window slides 7~11 are emptied.

However, in the conventional distributed type processing system, in the case of transmitting a short message for a short time, the transmission efficiency is decreased. In order to overcome the above-described problem, when the size of the window slide is increased, the error recover algorithm is complicated. Since the size of each message is not uniform, the size of the message buffer is determined by the size of the longest message.

SUMMARY OF THE INVENTION

Accordingly, it is an object of the present invention to provide an apparatus for transmitting and receiving a message between processors for a distributed type processing system and a method therefor which are capable of increasing a message transmission efficiency in the distributed type processing system and enhancing a communication performance by transmitting a plurality of short messages packed at a certain size by a transmission and receiving side processor when transmitting and receiving a message between processors for a distributed type processing system and unpacking the packed messages at the receiving side processor in older to overcome the problems encountered in the conventional art.

In order to achieve the above objects, there is provided a distributed type processing system which performs a real time communication between a plurality of processor and includes a packing unit for packing a plurality of messages in a certain message format when transmitting the messages and transmitting the packed messages to another processor, and an unpacking unit for judging an information stored in a certain message format when receiving a message from the another processor and unpacking the plurality of the packed messages, wherein said packing and unpacking units are provided in each processor.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments of the present invention will be explained with reference to the accompanying drawings.

Figure 2:
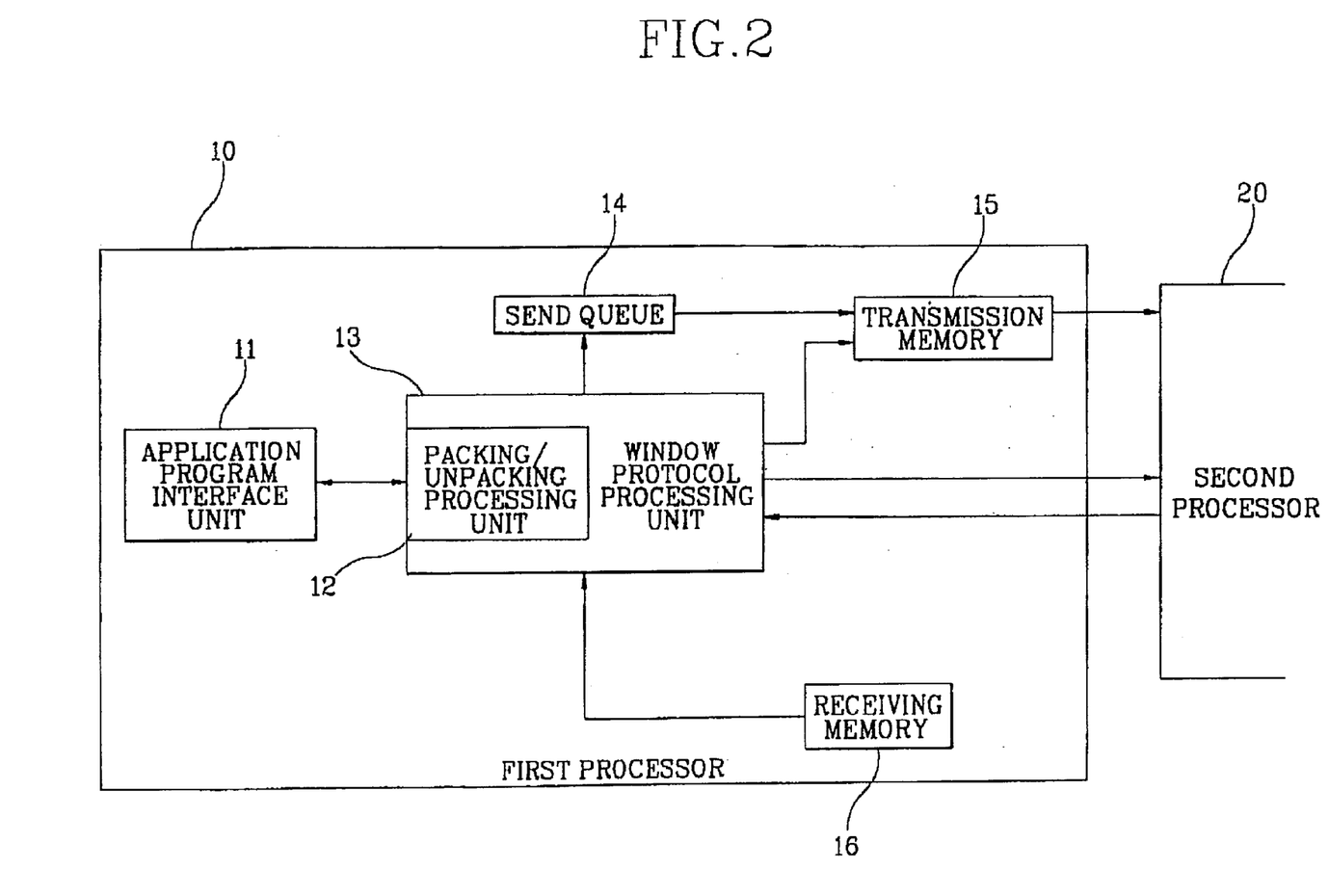
FIG. 2 is a block diagram illustrating a processor for transmitting and receiving a message between processors for a distributed type processing system according to the present invention.

Each processor for transmitting and receiving a message between processors for a distributed type processing system according to the present invention includes an application program interface unit 11, a packing and unpacking processing unit 12, a window protocol processing unit 13, a send queue 14, a transmission window memory 15, and a receiving window memory 16.

The application program interface unit 11 generates a transmission request signal when a transmission of a message is requested from an application program and applies the thusly generated signal to the window protocol processing unit 13 and matches a message inputted and outputted between a corresponding application program and a window protocol processing unit 13.

The window protocol processing unit 13 includes a packing and unpacking processing unit 12 for performing a destination classification function and an error recover function with respect to a transmission message and processing a protocol for transmitting and receiving a message with an opponent side processor. The packing and unpacking processing unit 12 packs a plurality of transmission messages in a certain size, sets a packing counter corresponding to the number of the packed transmission messages and unpacks into a message as much as the packing counter using a message size information included into the received packed message.

The send queue 14 includes the messages buffers in which the transmission messages having different lengths allocated by the window protocol processing unit 13 are stored, and queues the transmission of the transmission messages when the messages are not quickly transmitted to the opponent side processor.

The transmission and receiving window memories 15 and 16 each are formed of a plurality of window slides. The messages transmitted and received from the opponent side processor are temporarily stored in the window slide in accordance with a control of the window protocol processing unit 13.

In addition, FIG. 3 illustrates a message format according to the present invention. As shown therein, the message according to the present invention is formed of a protocol head portion "a" into which the entire length of the message and a packing counter are recorded, a message head portion "b" into which an address of a destination to which the message is transmitted and the length of each message are recorded, and a message body portion "c" into which the contents of the message to be transmitted are recorded.

Figure 4:
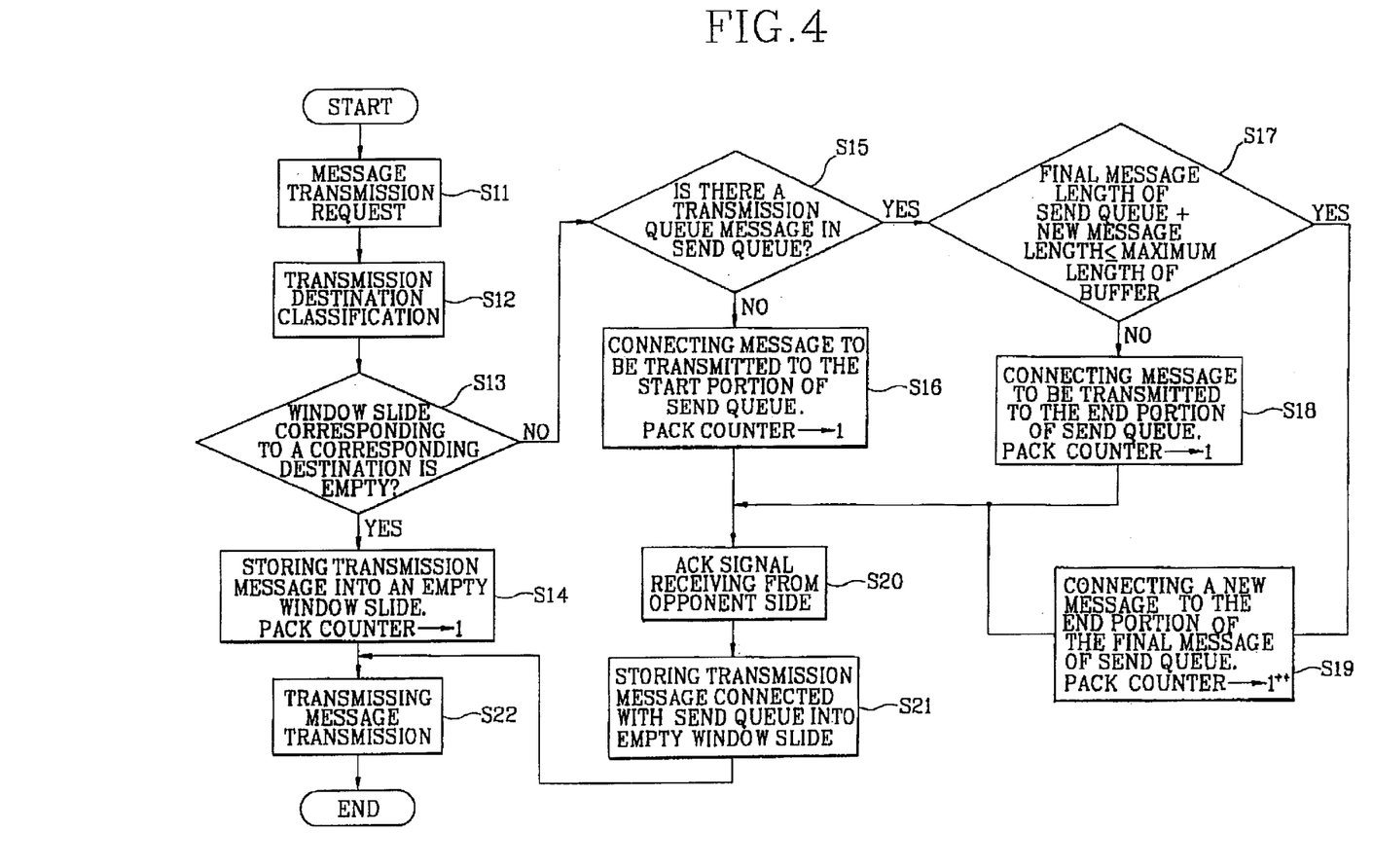
FIG. 4 is a flow chart illustrating a message transmitting operation between processors for a distributed type processing system according to the present invention.
Figure 5:
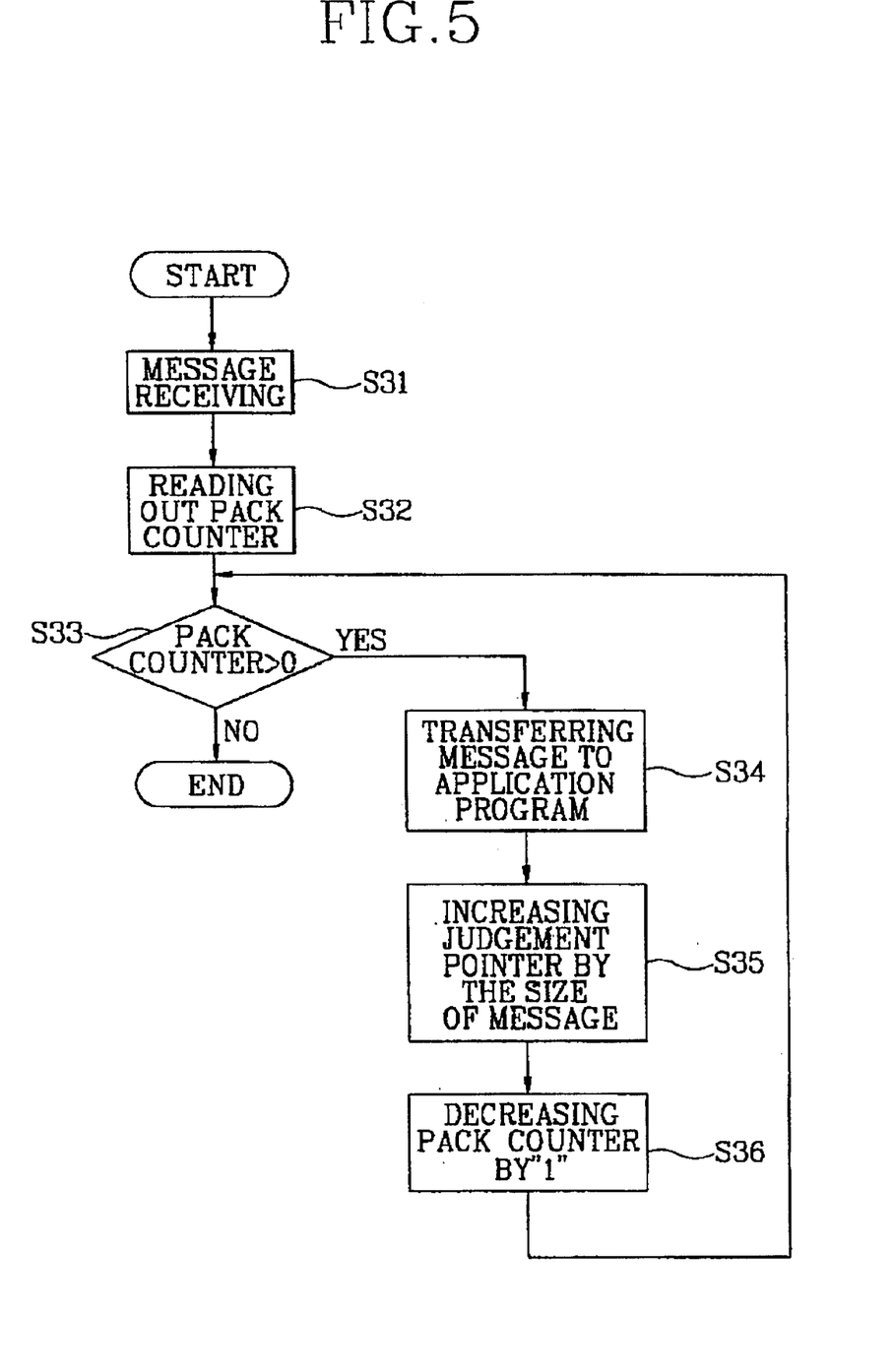
FIG. 5 is a flow chart illustrating a message receiving operation between processors for a distributed type processing system according to the present invention.

FIG. 4 is a flow chart illustrating a message transmitting operation between processors for a distributed type processing system according to the present invention, and FIG. 5 is a flow chart illustrating a message receiving operation between processors for a distributed type processing system according to the present invention.

The message transmitting and receiving operation between processors for a distributed type processing system according to the present invention will be explained with reference to FIGS. 4 and 5.

First, the operation that the message is transmitted from the first processor 10 to the second processor 20 will be explained.

When a message transmission is requested by the application program, the application program interface 11 receives the message transmission request and generates a transmission request signal and outputs the transmission request signal to the window protocol processing unit 13. The window protocol processing unit 13 receives a transmission message from the application program and recognizes an address information of the destination included in the transmission message and classifies the transmission destination of the transmission message in Step S12.

Thereafter, it is judged that whether the window slide corresponding to the classified destination is empty in Step S13. If the window slide corresponding to the destination is empty, the packing and unpacking processing unit 12 of the window protocol processing unit 13 sets the packing counter of the protocol head "a" of the transmission message as "1" and sets the total length identically to the length of the current message. Thereafter, the transmission message is stored into the empty window slide in Step S14. The transmission message stored in the window slide is transmitted to the second processor 20, which is the opponent side processor, based on the known sliding window protocol method.

In Step S14, if the window slide corresponding to the destination is not empty, the window protocol processing unit 13 confirms whether there is a transmission queue message at the send queue 14 corresponding to the destination in Step S15. If there is not the transmission queue message, a new buffer is allocated to the send queue 14, and the message is copied. The packing and unpacking processing unit 12 sets the packing counter of the protocol head "a" of the message pocket as "1" and sets the total length identically to the length of the current message. The start portion of the send queue 14 is connected in Step S16.

In Step S15, if the transmission queue message of the send queue 14 is stored in the buffer, the size of the remaining regions of the message buffer connected to the end portion of the send queue 14 and the size of the transmission message are compared, so that it is judged that whether the transmission message is stored in the remaining regions of the buffer.

At this time, since the side of the remaining regions of the message buffer connected to the end portion of the send queue 14 is not greater than the size of the transmission message, if the current message is not connected with the buffer, in other words, the value obtained by summing the size of the message previously stored in the buffer and the size of the current message is greater than the maximum size of the buffer, a new message buffer is allocated to the send queue 14, and the message is copied. The packing counter of the transmission message is set as "1", and the total length is set identically to the length of the current message. The message buffer in which the message is stored is connected with the end portion of the send queue 14.

In Step S17, since the size of the remaining regions of the message buffer is greater than the size of the current message, if it is possible to connect the current message to the buffer for thereby storing the same, the message which is to be transmitted is connected with the end portion of the message stored in the message buffer connected to the end portion of the send queue 14, and the packing counter of the protocol head "a" of the transmission message is increased by "1" in Step S19.

Namely, whenever the transmission request is received, Steps S12 through S19 are repeatedly performed, so that a plurality of small size messages are stored in one message buffer.

Figure 3A:
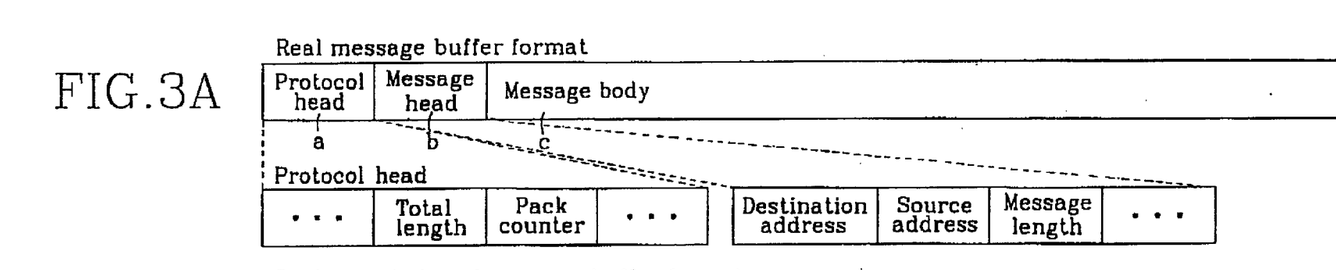
FIG. 3 is a view illustrating an embodiment of a packed message which is transmitted and received between processors according to the present invention.
Figure 3B:
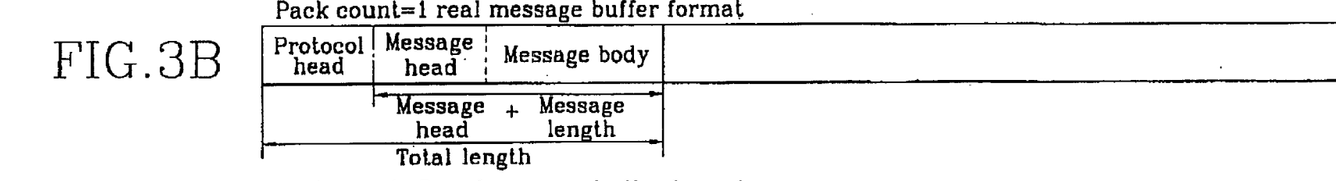
Figure 3C:
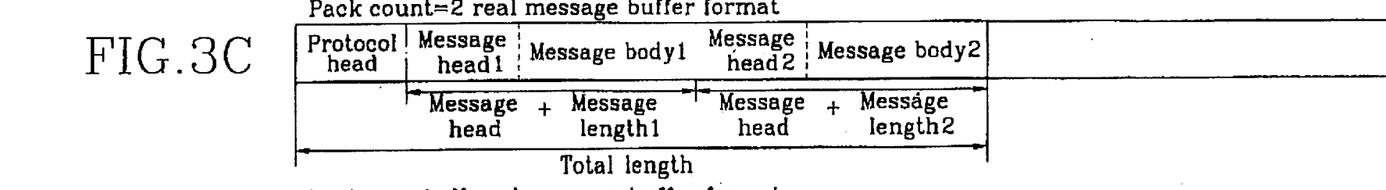
Figure 3D:
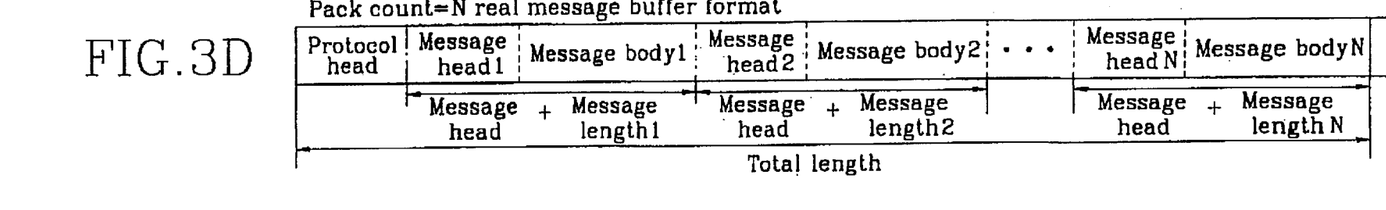

Assuming that the N number of different messages are stored in one message buffer as shown in FIG. 3D, the packing counter of the protocol head "a" positioned at the start portion of the message format is set as "N", and the total length is stored as a value which is obtained by summing the lengths of each message. The following messages of the N number are stored based on the connection between the message head "b" and the message body "c".

After Steps S16, S18 and S9, when an ACK signal is received from the second processor which is the opponent processor at the window protocol processing unit 13 in Step S20, the window protocol processing unit 13 stores the messages into the empty window slide in a sequence from the transmission messages stored in the first message buffer connected with the send queue 14 in Step S21, and in Step S22, the transmission messages stored in the window slide are transmitted to the second processor 20 in accordance with a sliding window protocol.

Next, the operation that the first processor 10 receives the messages from the second processor 20 will be explained with reference to FIG. 5.

First, when the message from the second processor 20 is received into the receiving window memory 16 in Step S14, the window protocol processing unit 13 reads a packing counter stored in the protocol head "a" of the receiving message in Step S32 and confirms whether the packing counter is greater than "0".

At this time, if the packing counter is not greater than "0", the message receiving step is finished. Otherwise, the first message is read out among the received receiving messages and is transferred to the application program via the application program interface unit 11. The message length 1 stored in the message head 1 "b" of the first message is read out, and the message judging pointer is increased as much as the thusly read-out message in Step S35, and the packing counter of the protocol head "a" is decreased by "1" in Step S36.

Thereafter, the routine is returned to Step S33. Steps S34 through S36 are repeatedly performed, and the packing counter is decreased one by one. When the thusly decreased value reaches 0, the N number of the messages are divided for thereby implementing a receiving operation of the messages.

As described above, in the present invention, each processor includes a packing and unpacking processing unit, so that a plurality of short messages are packed at the transmission side processor in a certain size during a communication between the processors. The thusly packed messages are unpacked at the receiving side processor, so that the message transmission efficiency of the distributed type processing system is enhanced for thereby enhancing a communication performance.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for transmitting and receiving messages between processors in a distributed-type processing system, comprising:

a packing unit for packing a plurality of messages into a packed transmission message having a size defined by a sliding window of a transmission buffer, each of said messages having a same destination and a certain message format, and transmitting the packed transmission message with a packing counter value indicative of a number of the packed messages to an opponent side processor; and an unpacking unit for judging a packing counter value contained in a received packed message, and unpacking the received packed message into a plurality of messages according to the judged packing counter value.

2. The apparatus of claim 1, wherein a format of said packed transmission message includes:

a protocol head including the packing counter value which represents the number of packed messages in the packed transmission message, and a plurality of message bodies which include contents of respective ones of the plurality of messages packed in the packed transmission message, wherein the certain message format of each of said plurality of messages includes length information indicative of a length of said each message.

3. The apparatus of claim 1, wherein said packing unit packs the plurality of messages having said same destination into the packed transmission message based on an entire predetermined length of the packed transmission message, and sets the packing counter value to as many as a number of the packed messages, and wherein each of the messages in the packed transmission message has a different length.

4. The apparatus of claim 1, wherein said unpacking unit judges information corresponding to a number of the messages in the received packed message and a length of each message in the received packed message and performs an unpacking operation.

5. An apparatus for transmitting and receiving messages between processors in a distributed-type processing system, comprising:

a packing unit for packing a plurality of messages into a packed transmission message, each of said messages having a same destination and a certain message format, and transmitting the packed transmission message with a packing counter value indicative of a number of the packed messages to an opponent side processor;

an unpacking unit for judging a packing counter value contained in a received packed message, and unpacking the received packed message into a plurality of messages according to the judged packing counter value;

a window protocol processing unit for classifying said same destination of the packed messages to be transmitted and processing a protocol for transmitting the packed transmission message to and receiving the received packed message from the opponent side processor;

an application program interface unit for generating a transmission request signal in accordance with a message transmission request from an application program, transmitting the transmission request signal to the window protocol processing unit, and performing a message matching between the application program and the window protocol processing unit;

a send queue for allocating a storing area for the packed transmission message based on said same destination connected with a message buffer when the packed transmission message is not immediately sent to the opponent side processor; and a transmitting and receiving window memory, which is a memory formed of a plurality of window slides, for temporarily storing the packed transmission message to be transmitted to and the received packed message received from the opponent side processor into the window slide in accordance with a control of the window protocol processing unit, wherein the send queue and each window slide corresponds to said same destination of the packed transmission message.

6. A method for transmitting and receiving a message between processors in a distributed-type processing system capable of performing a real-time communication among a plurality of processors, comprising:

classifying destinations of a plurality of messages to be transmitted;

packing a plurality of messages having a same destination among the classified messages into a packed message having a size defined by a sliding window of a transmission buffer, each of the classified messages having a certain message format;

transmitting the packed message with a packing counter value in accordance with a sliding-window protocol to an opposite side processor; and reading the packing counter value from the packed message at the opposite side processor and unpacking the packed message into said plurality of messages based on the packing counter value.

7. The method of claim 6, wherein the packed message has a format which includes:

a protocol head including the packing counter value which represents a number of messages packed into the packed message and length information indicative of an entire length of the packed message;

more than one message head each including a destination address, a source address and a message length information corresponding to a respective one of the plurality of messages packed into the packed message; and more than one message body each including contents of a respective one of the plurality of messages in the packed message.

8. A method for transmitting and receiving a message between processors in a distributed-type processing system capable of performing a real-time communication among a plurality of processors, comprising:

classifying destinations of a plurality of messages to be transmitted;

packing a plurality of messages having a same destination among the classified messages into a packed message, each of the classified messages having a certain message format;

transmitting the packed message with a packing counter value in accordance with a sliding-window protocol to an opposite side processor; and reading the packing counter value from the packed message at the opposite side processor and unpacking the packed message into said plurality of messages based on the packing counter value, wherein said message packing step includes:

(a) classifying said same destination of the messages to be transmitted in the packed message;

(b) judging whether a window slide corresponding to said same destination is empty;

(c) judging whether there is a queue message in a send queue corresponding to said same destination in the case that there is not an empty window slide as a result of the judgment in step (b);

(d) judging a size of remaining regions of a buffer in which a queue last message is stored in the case that there is not a queue message in the send queue as a result of the judgment in step (c);

(e) connecting a message to be currently transmitted to an end portion of a message previously stored in the buffer and increasing the packing counter by "1" in the case that the size of the remaining regions of the buffer is greater than or is the same as the size of the current message and increasing the packing counter by "1"; and (f) sequentially transmitting the message stored in the send queue when the window slide of the destination is emptied after step (e).

9. The method of claim 8, further comprising:

setting the packing counter of the packed message as "1" and transmitting the packed message in the case that there is an empty slide as a result of the judgment in step (b).

10. The method of claim 8, wherein step (f) is performed after allocating a new buffer in the case that there is not a queue message in the send queue as a result of the judgment in step (c), storing the message to be currently transmitted, setting the packing counter as "1", and connecting the set packing counter to a start portion of the send queue.

11. The method of claim 8, wherein step (f) is performed after allocating a new buffer in the case that the size of the remaining regions of the buffer is smaller than the size of the message to be currently transmitted as a result of the judgment of step (d), storing the current message to be transmitted, setting the packing counter as "1", and connecting the set packing counter to the end portion of the send queue.

12. A method for transmitting and receiving a message between processors in a distributed-type processing system capable of performing a real-time communication among a plurality of processors comprising:

classifying destinations of a plurality of messages to be transmitted;

packing a plurality of messages having a same destination among the classified messages into a packed message, each of the classified messages having a certain message format;

transmitting the packed message with a packing counter value in accordance with a sliding-window protocol to an opposite side processor; and reading the packing counter value from the packed message at the opposite side processor and unpacking the packed message into said plurality of messages based on the packing counter value, wherein said message unpacking step includes:

(a) reading out the packing counter value from the received packed message;

(b) judging a size of the packing counter value;

(c) transferring the received packed message to an application program in the case that the packing counter value is greater than 0 as a result of the judgment of step (b);

(d) judging a first message length information from the received packed message, increasing the judging pointer as much as a size of the first message, decreasing the packing counter value by "1" and feeding back to step (b); and (e) finishing the message unpacking step when the packing counter value is 0 as a result of the judgment of step (b).

13. A method for transmitting and receiving data in a distributed-type processing system, comprising:

forming a packed transmission message having a size defined by a sliding window of a transmission buffer, the packed transmission message being formed by:

generating a protocol head including a packing counter which represents a number of packed messages and length information indicative of a total length of the messages;

including more than one message head with the protocol head, each message head including a destination address, a source address and length information indicative of a length of a corresponding one of the messages; and including more than one message body with the protocol head, each message body storing contents of a respective one of the messages.

\* \* \* \* \*